No. 620,341. Patented Feb. 28, 1899.
E. G. MEDRICK.
ANTIRATTLER SHAFT COUPLING.
(Application filed Dec. 13, 1898.)
(No Model.)
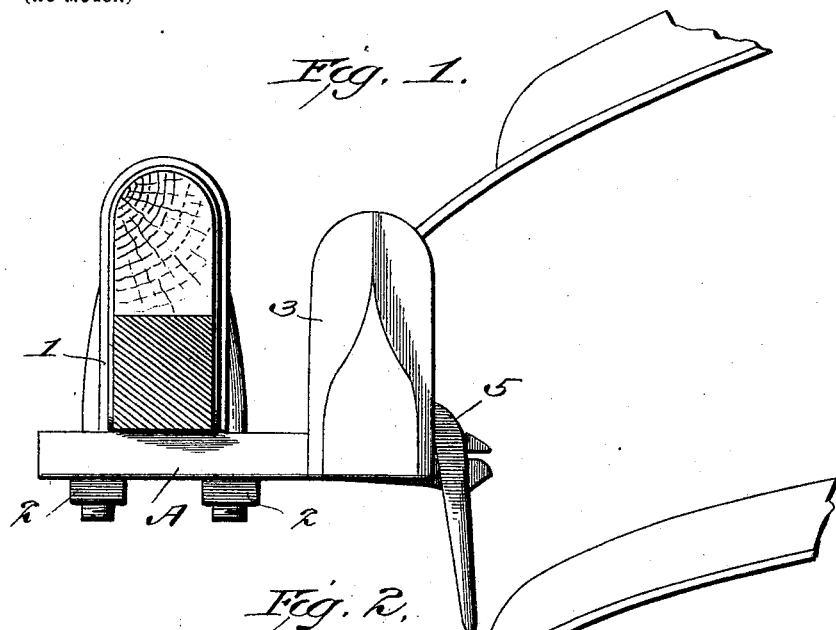
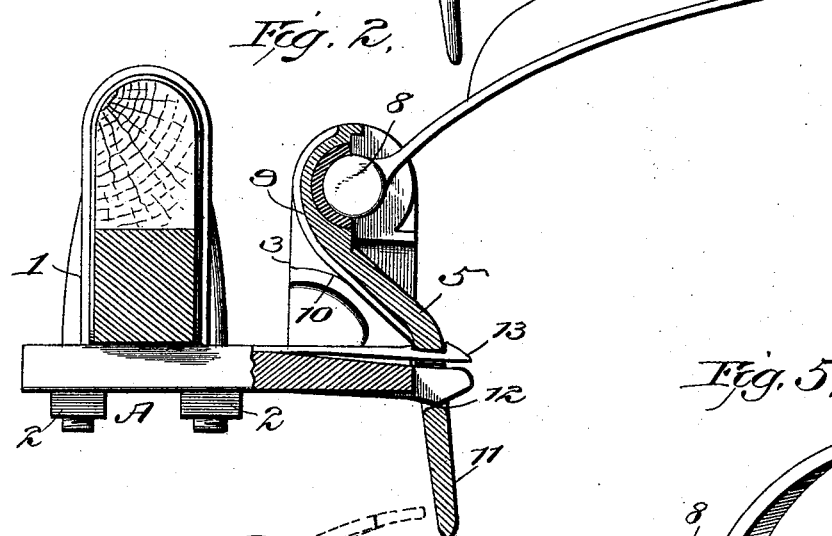
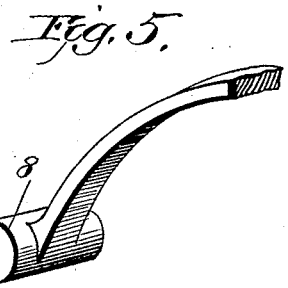
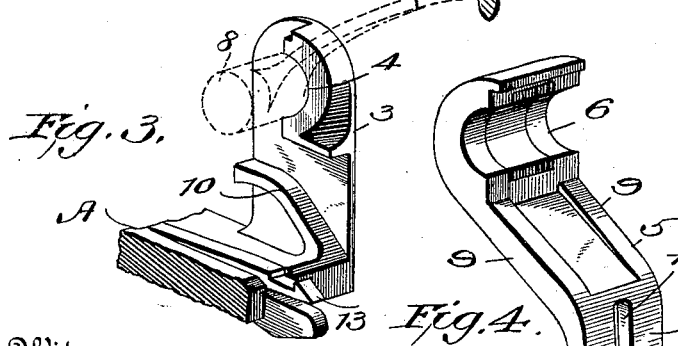
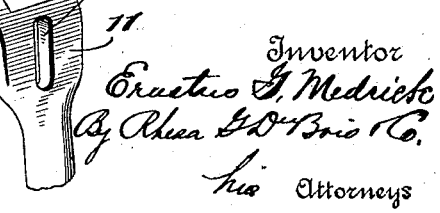
Witnesses
Inventor
Erastus G. Medrick
By Rhea & D. Brio & Co.
his Attorneys

UNITED STATES PATENT OFFICE.

ERASTUS G. MEDRICK, OF MIDDLETOWN, NEW YORK.

ANTIRATTLER SHAFT-COUPLING.

SPECIFICATION forming part of Letters Patent No. 620,341, dated February 28, 1899.

Application filed December 13, 1898. Serial No. 699,171. (No model.)

*To all whom it may concern:*

Be it known that I, ERASTUS G. MEDRICK, a citizen of the United States of America, residing at Middletown, in the county of Orange and State of New York, have invented certain new and useful Improvements in Antirattler Shaft-Couplers, of which the following is a specification.

My invention relates to an improved antirattler shaft-coupling, the object being to provide a device which can be easily constructed and which at the same time will be cheap and durable and will require no bolts or rivets and may be made of malleable iron, either cast or drop-forged.

With this object in view my invention consists in certain novel features of construction and combinations of parts, which will be hereinafter described, and pointed out in the claims.

In the accompanying drawings, Figure 1 is a view in side elevation, the axle being shown in section. Fig. 2 is a similar view with the coupling in section, and Figs. 3, 4, and 5 are views of the several parts detached.

A represents a plate adapted to be placed beneath the forward axle of a vehicle, and 1 is an ordinary clip for securing the plate rigidly to the axle, the nuts 2 2 being employed for fastening the parts in position. A pair of uprights 3 3 are secured to the forward end of the plate A, and these uprights are each provided with the curved sockets 4 4.

The numeral 5 indicates a clamping-lever. This lever is furnished with a curved recess 6, in which is placed a facing of rubber, leather, or similar soft material, and between this recess and the sockets 4 4 the shaft-iron 8 is held.

The lever 5 is preferably bent in substantially the form shown and provided with flanges 9 9 at its edges, which gives strength to it and also constitutes bearings which rest upon the shoulders 10 10, formed on the inner faces of the uprights 3 3. The lever terminates at its lower end in a handle 11, by means of which it is manipulated, and is provided also with a slot 12. A catch 13 on the forward end of plate A is adapted to enter the slot and lock the lever in position, when the shaft-iron is held in place against rattling.

The construction of the catch is such that the lever can be easily fastened or unfastened, and at the same time its strength is sufficient to hold the lever securely locked against accidental displacement, and the combined action of the lower end of this catch and the shoulders back of and beneath the lever is of such a nature that it is impossible to displace the lever or even loosen it by any pressure from the shaft-iron either in backing or pulling the vehicle, and the only way to uncouple the device is to pull forward on the handle 11 until it slides beyond the latch, the lever resting during that operation upon the shoulders. Thus released the lever may be forced rearwardly and aside by merely pushing the shafts backward and raising them out of the sockets.

To either couple or uncouple the shafts, it is merely necessary for the operator to place the index-finger of each hand back of the handles 11 and pull them forward, after which the shafts may be pushed back and upward away from the sockets, so that it is but a moment's work to either couple or uncouple. To couple the shafts, the operation is of course just the reverse.

It is evident that slight changes might be made in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In an antirattler shaft-coupling, a pair of uprights having an open socket, and shoulders, a lever fulcrumed on said shoulders and having the counterpart for the open socket and means for locking the lever in position.

2. In a shaft-coupling, a pair of uprights having open sockets therein and provided with shoulders, a lever fulcrumed on said shoulders and having the counterpart of said sockets, and a spring-catch coöperating with the lever to lock it in position.

3. A shaft-coupling consisting of a clip, a plate having a catch projecting from its forward end, a pair of uprights projecting upwardly from the plate, said uprights having sockets and shoulders, and a lever having the counterpart of the sockets, said lever fulcrumed on the shoulders and provided with a slot adapted to receive the catch on the plate.

4. The combination with uprights having shoulders and sockets on their inner faces, and a catch, of a lever coöperating with the sockets to hold a carriage-iron, said lever provided with a slot to receive the catch, the catch and shoulders coöperating to lock the lever, the lever terminating at its lower end in a handle to be manipulated for unlocking the lever.

5. The combination with a plate, and a clip for securing the plate to an axle, of a pair of uprights secured to or integral with the forward end of the plate, said uprights having shoulders and sockets on their inner faces, a lever having recesses provided with a soft facing, the carriage-iron held between the faced recess and the socket against rattling, the lever provided with a slot and a handle, and a catch projecting forwardly from the forward end of the plate and adapted to enter the slot therein and lock the lever securely in position.

ERASTUS G. MEDRICK.

Witnesses:
WM. C. HARTIGAN,
W. F. STRATTON.